Nov. 17, 1953 W. A. WERKER ET AL 2,659,570
VALVE
Filed Nov. 17, 1949
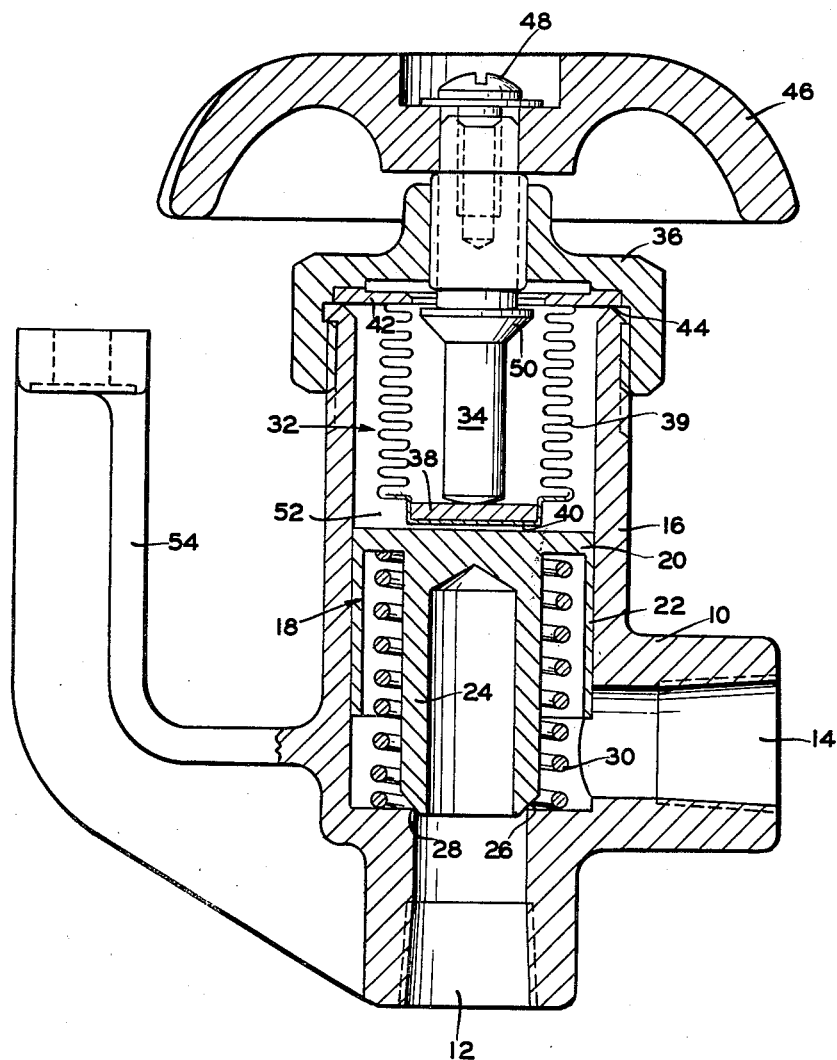
INVENTORS
WILLIAM A. WERKER
JOSEPH STEENFELD
BY O. J. Brattie
ATTORNEY ic Nov. 17, 1953

2,659,570

UNITED STATES PATENT OFFICE 2,659,570

VALVE

William A. Werker, Palisades Park, N. J., and Joseph Steenfeld, New York, N. Y., assignors to Bendix Aviation Corporation, Teterboro, N. J., a corporation of Delaware Application November 17, 1949, Serial No. 141,446

1 Claim. (Cl. 251—141)

The present invention relates to valves and more particularly to a glandless valve.

In certain types of valves, particularly valves for controlling the flow of a fluid, such as oxygen, under high pressures, difficulties have been experienced in the past in keeping the gland or the packing of the valve from leaking especially when the valve is to be used at extremely low temperatures. The present invention contemplates the provision of a novel valve which requires no packing or gland and which is particularly suitable for use as a shut-off valve for an oxygen supply and whose operativeness and effectiveness are not affected by large temperature variations.

Accordingly, one object of the present invention is to provide a novel, simple and efficient valve which requires no packing subject to leakage under high pressures or at extremely low temperatures.

Another object is to provide a novel valve utilizing an expansible bellows for sealing the fluid chamber from the valve stem thereof.

Another object is to provide a novel and simple valve particularly suitable for a shut-off valve for a liquid oxygen supply.

Still another object is to provide a simple and novel valve for use as a shut-off valve for a fluid such as oxygen, unaffected by great temperature variations.

A still further object is to provide a novel and efficient glandless valve for controlling the flow of fluid utilizing an expansible bellows enclosing the valve stem and interposed between the valve stem and the valve element.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for the purpose of illustration and description only, and is not intended as a definition of the limits of the invention.

In the single figure of the drawing, the novel valve is shown partly in section and partly in elevation as comprising a valve body 10 having an inlet 12, an outlet 14 and a barrel or cylinder 16 for receiving a piston valve 18 for controlling the flow of fluid between the inlet and the outlet. The inlet and outlet are shown as being provided with pipe-threads for receiving nipples of conduits for piping the fluid from a source of liquid or gaseous oxygen under high pressure through the valve to a remote point such as a pressure reducer, for instance.

Piston valve 18 comprises a flat cylindrical body 20 having a downwardly extending skirt portion 22 forming a sliding fit within the cylinder for reciprocal movements therein and a hollow cylindrical member 24 extending downwardly coaxially with the skirt portion terminating in an outwardly beveled surface 26 adapted to engage a valve seat 28 thereby to close inlet 12. A compression spring 30 surrounds the cylindrical member 24 and rests against the bottom of the barrel to bias the piston valve upwardly toward open position.

Opposing movements of the piston valve is a bellows assembly 32 completely enclosing a valve actuating stem or rod 34 threaded to cap 36 which forms a cover for the barrel, the rod abutting insert 38 of the bellows assembly.

The bellows assembly comprises an expansible bellows 39 having a closed end 40 and spun over a bellows plate 42 at the other end and soldered thereto. Cap 36 is provided with internal threads for engaging external threads on barrel 16 which is terminated in a knife edge 44. Bellows plate 42 is interposed between the cap and the knife edge of the barrel to form a tight permanent seal between the exterior and the interior of the valve body when the cap is screwed onto the barrel. The valve stem 34 extends beyond the cap and is provided with a seat for receiving a handle 46 secured thereto as by a screw 48. The other end of the valve stem is rounded as shown to provide a smooth contact surface with insert 38 fitting within and resting against the closed end 40 of bellows 39. The valve stem is provided with an expanded section or collar 50 arranged to engage cap 36 to limit the outward travel of the valve stem.

It will be noted by this described construction that bellows 39 completely seals the valve stem from the space 52 within the barrel and consequently no packing between the valve stem and the cap is necessary. As a matter of fact the threaded engagement between the cap and the valve stem is made sufficiently free to permit unrestricted flow of air between the interior of the bellows and the atmosphere so that the pressure within the bellows is always equal to the atmospheric pressure. The sliding fit between skirt portion 22 of piston valve 18 and the interior of cylinder 16 is sufficiently loose to permit equalization of pressure between space 52 and outlet 14 in order to prevent the building up of pressure within the space which would oppose movements of the piston valve.

The valve housing is provided with a mounting bracket 54 for convenient mounting of the valve.

Coming now to the operation of the novel valve, it will be assumed that inlet 12 is connected to a source such as liquid oxygen under high pressure and that outlet 14 is connected to a pressure reducer for example. If the valve is to be used for oxygen equipment on aircraft the valve may be exposed to temperatures below −50 degrees Fahrenheit and at altitudes in excess of 50,000 feet, but by the construction described above, these conditions will not affect the proper operation of the valve.

In order to close the valve, handle 46 is turned whereby bellows 39 is extended to force piston valve 18 downwardly until beveled surface 26 thereof contacts valve seat 28 against the biasing force of compression spring 30. For long life, the valve seat and the beveled surface may both be made of metal carefully ground to insure proper fit therebetween. In this position piston valve 18 is biased toward open position by the fluid pressure in the inlet and within the hollow cylindrical portion 24 of the valve and by the compression spring 30.

In order to open the valve, handle 46 and hence valve stem or rod 34 is turned in the proper direction whereby bellows 39 is free to contract under the combined pressure of the fluid source and the compression spring permitting fluid to flow from inlet 12 past valve seat 28 into outlet 14. The upward travel of the valve stem and hence of the piston valve 18 is limited by collar 50 of the stem abutting the underside of cap 36. Although the fluid is free to flow between skirt 22 and barrel 16 into space 52 it is sealed from the valve stem 34 by the sealed bellows 39.

By this simple construction, the novel valve described herein, if properly made, will have practically unlimited life because there are no critical wearing surfaces, and no leakage will occur as long as bellows 39 remains imperforate.

Although only one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

We claim:

A glandless valve for controlling the flow of high pressure fluids comprising a valve body having an open end chamber formed therein, an externally threaded portion terminating in a knife-like edge adjacent the open end of said chamber, inlet means including a valve seat in axial alignment with said chamber and outlet means communicating with said chamber adjacent said inlet means, said outlet means in communication with said chamber; closure means for the open end of said chamber comprising a mounting plate adapted to engage the knife-like edge of said body and having a central aperture, a bellows sealingly secured at one end to said mounting plate about the aperture therein and having a re-enforced wall closing the opposite end thereof, said bellows being positioned within said chamber, and a cap having internal threads for engagement with the externally threaded portion of said body whereby said mounting plate is sealingly clamped between said cap and the knife-like edge of said body; a piston valve comprising a flat body having a rigid skirt whereby said piston valve is slidably mounted in said chamber, and a centrally disposed hollow valve member coaxial with said skirt, said valve member having an open end in axial alignment with and communicating with said inlet means and a surface formed on the open end thereof for engagement with the valve seat of said inlet means; a spring encircling said hollow stem and operative between the end wall of said chamber and the flat body to bias said piston valve in a direction away from said valve seat and into engagement with the re-enforced wall of said bellows; and valve actuating means comprising a valve stem threadedly mounted in said cap, said valve stem having a portion thereof extending through the aperture in said mounting plate into the interior of said bellows and engaging the re-enforced wall of said bellows, and means mounted on said valve stem exteriorly of said body for rotating said valve stem to expand said bellows and thereby adjust said piston valve relative to said valve seat against the bias of said spring.

WILLIAM A. WERKER.
JOSEPH STEENFELD.

References Cited in the file of this patent

UNITED STATES PATENTS

| Number | Name | Date |
|---|---|---|
| 181,497 | Thomas | Aug. 22, 1876 |
| 877,875 | Van Nostran | Jan. 28, 1908 |
| 978,288 | Harkom | Dec. 13, 1910 |
| 1,374,571 | Hummel | Apr. 12, 1921 |
| 1,381,818 | Fulton | June 14, 1921 |
| 2,061,028 | Forbes | Nov. 17, 1936 |
| 2,144,754 | Forbes | Jan. 24, 1939 |

FOREIGN PATENTS

| Number | Country | Date |
|---|---|---|
| 359,600 | Italy | Mar. 31, 1938 |
| 361,655 | Germany | Nov. 4, 1919 |
| 498,893 | France | Jan. 24, 1920 |
| 780,169 | France | Apr. 19, 1935 |